United States Patent
Huynh

(10) Patent No.: US 8,059,429 B2
(45) Date of Patent: Nov. 15, 2011

(54) USING OUTPUT DROP DETECTION PULSES TO ACHIEVE FAST TRANSIENT RESPONSE FROM A LOW-POWER MODE

(75) Inventor: Steven Huynh, Fremont, CA (US)

(73) Assignee: Active-Semi, Inc. (VG)

( * ) Notice: Subject to any disclaimer, the term of this patent is extended or adjusted under 35 U.S.C. 154(b) by 0 days.

(21) Appl. No.: 12/655,481

(22) Filed: Dec. 31, 2009

(65) Prior Publication Data
US 2011/0157936 A1 Jun. 30, 2011

(51) Int. Cl.
*H02M 3/335* (2006.01)
(52) U.S. Cl. .......................... 363/18; 363/21.12
(58) Field of Classification Search .................... 363/18, 363/20, 21.01, 21.04, 21.07, 21.09, 21.12, 363/21.15, 21.16, 21.17
See application file for complete search history.

(56) References Cited

U.S. PATENT DOCUMENTS

| | | | |
|---|---|---|---|
| 6,775,164 B2 * | 8/2004 | Wong et al. | 363/147 |
| 7,307,390 B2 | 12/2007 | Huynh et al. | 315/291 |
| 7,518,885 B2 * | 4/2009 | Baurle et al. | 363/16 |
| 2004/0136206 A1 * | 7/2004 | Kinoshita et al. | 363/16 |
| 2006/0285365 A1 | 12/2006 | Huynh et al. | 636/16 |
| 2007/0133234 A1 | 6/2007 | Huynh et al. | 363/20 |
| 2008/0192515 A1 | 8/2008 | Huynh et al. | 363/21.12 |
| 2008/0259650 A1 | 10/2008 | Huynh et al. | 363/21.12 |
| 2008/0259652 A1 | 10/2008 | Huynh et al. | 363/21.12 |
| 2008/0259654 A1 | 10/2008 | Huynh et al. | 363/21.16 |
| 2009/0040793 A1 | 2/2009 | Huynh et al. | 363/21.12 |
| 2009/0237063 A1 | 9/2009 | Kunst | 323/312 |
| 2010/0085776 A1 * | 4/2010 | Mimura | 363/15 |

* cited by examiner

*Primary Examiner* — Adolf Berhane
*Assistant Examiner* — Nguyen Tran
(74) *Attorney, Agent, or Firm* — Imperium Patent Works; T. Lester Wallace; Darien K. Wallace

(57) ABSTRACT

In a first aspect, in a Primary Side Regulation (PSR) power supply, some primary current pulses are used to forward bias an output diode such that an auxiliary winding voltage can be properly sampled after each pulse. The samples are used to regulate the power supply output voltage (VOUT). Other primary current pulses, however, are of a smaller peak amplitude. These pulses are not used for VOUT regulation, but rather are used to determine whether the VOUT has dropped. In a second aspect, a transient current detector circuit within the PSR controller integrated circuit detects whether an optocoupler current has dropped in a predetermined way. If the TRS current detector detects that the optocoupler current has dropped, then the power supply stops operating in a sleep mode and is made to operate in another higher power operating mode in which the power supply switches.

21 Claims, 13 Drawing Sheets

PSR POWER SUPPLY

SECONDARY SIDE REGULATOR

PRIMARY SIDE REGULATOR

LOW-POWER STANDBY MODE

PSR POWER SUPPLY

FMOD

OSCILLATOR AND TRAMP DETECTOR

ILIM AND PULSE WIDTH MODULATOR
LOGIC OF FIG. 6 IN MORE DETAIL

PWM LOGIC

NORMAL MODE

LOW-POWER STANDBY MODE

TRS CURRENT DETECTOR
OPERATION

STANDBY MODE TO NORMAL MODE

USING OUTPUT DROP DETECTION PULSES TO ACHIEVE FAST TRANSIENT RESPONSE FROM A LOW-POWER MODE

TECHNICAL FIELD

The present disclosure relates generally to Primary-Side Regulation (PSR) power supplies and PSR controller integrated circuits.

BACKGROUND INFORMATION

FIG. 1 (Prior Art) is a block diagram of a Secondary-Side Regulation (SSR) flyback power supply 1. An alternating current (AC) 110-240 volt line voltage on input terminals 2 and 3 is rectified by a full wave bridge rectifier 4 and an associated smoothing capacitor 5 so that a rectified and smoothed rough DC voltage is present between the first and second input nodes 6 and 7. The voltage on first input node 6 is also referred to as the "input line voltage" or "line input voltage" (VIN). A SSR controller integrated circuit 8 is powered by a DC voltage supplied by auxiliary winding 9 of a transformer 10 and a rectifier involving diode 11 and capacitor 12. Immediately after startup when the rectifier has not yet switched an adequate number of times to charge capacitor 12, start up power for integrated circuit 8 is received via resistor 13. Flyback converter 1 operates by repeatedly closing and opening a switch 14. Closing switch 14 causes a primary current IP to flow from node 6, through a primary winding 15 of transformer 10, through switch 14, through a current sense resistor 16, and to node 7. The flow of this primary current IP causes energy to be stored in transformer 10.

FIG. 2 (Prior Art) is a waveform diagram of an operation of the secondary side regulator of FIG. 1. The second waveform labeled IP represents the current flowing through the primary winding 15. Switch 14 is on from time T1 to time T2. Accordingly, primary current IP increases from time T1 to time T2.

Next, switch 14 is opened at time T2, and primary current IP stops flowing. The energy stored in transformer 10 is then transferred to the output of power supply 1 in the form of a pulse of current IS flowing through the secondary winding 17 of transformer 10. The bottom waveform labeled IS in FIG. 2 represents this secondary current. The pulse of secondary current IS flows from time T2 to time T3. Secondary current IS flows through secondary winding 17 and through a rectifying diode 18. Such pulses of the secondary current IS charge an output capacitor 19. Charge is maintained on output capacitor 19 such that a desired voltage VOUT is maintained across output terminals 20 and 21.

Consider a situation in which the load (not shown) coupled across output terminals 20 and 21 is a light load. Power supply 1 is only supplying a small amount of energy to the load in order to maintain the voltage VOUT regulated to its desired value. The power supply is not current limited. It therefore is in steady state operation and is operating in a constant voltage mode. Switch 14 is switched to open and close rapidly and in such a manner that the output voltage VOUT on output capacitor 19 is regulated to a substantially constant desired voltage.

Power supply 1 is said to have a "primary side" 22 and a "secondary side" 23. Power supply 1 is said to be a "secondary side regulation" power supply because its controller integrated circuit 8 responds via an optocoupler while the voltage monitoring is done via the secondary side reference amplifier 27. In a constant-voltage (CV) operational mode, the output voltage VOUT across output terminals 20 and 21 is sensed by a resistor divider involving resistors 24 and 25. The center tap 26 of the resistor divider is coupled to a terminal of a voltage reference integrated circuit 27. If the voltage on the center tap of the resistor divider is above a reference voltage, then the voltage reference integrated circuit 27 draws a current through an optocoupler 28. The current flows from first output terminal 20, through a current limiting resistor 29, and through optocoupler 28, through voltage reference 27, and to second output terminal 21. When this current flows, the optocoupler causes a corresponding current to be drawn out of a feedback terminal FB 30 of the controller integrated circuit 8. Current 30 is an error current that is indicative of the voltage level on output terminals 20 and 21. Controller 8 uses the detected magnitude of error current 30 to control the on/off duty cycle of switch 8 so as to regulate output voltage VOUT.

The output current IOUT is related to the peak of the primary current IP that is switched through the primary winding 15 of transformer 10. The magnitude of current IP is detected by the sense resistor 16 in the primary current path. Under high loading conditions, if the IOUT output current through output terminals 20 and 21 would exceed a specified current, then the power supply is made to operate in a constant current (CC) mode. Controller 8 controls the on/off duty cycle of switch 14 to limit the peak of primary current IP to an amount that corresponds to the specified maximum output current IOUT. The secondary side regulator (SSR) power supply 1 of FIG. 1 operates satisfactorily well in many applications, but it can be undesirably expensive in ultra low cost applications. Optocoupler 28 and voltage reference 24 are relatively expensive electronic components.

FIG. 3 (Prior Art) is a block diagram of another type of power supply referred to here as a Primary-Side Regulation (PSR) flyback power supply 31. Full wave bridge rectifier 32 and associated capacitor 33 provide a rough DC voltage as in the SSR example of FIG. 1. As in the SSR example of FIG. 1, PSR power supply 31 operates by repeatedly closing and opening a switch. In the illustrated example, the switch is a bipolar transistor 34. Closing switch 34 causes a primary current IP to flow from node 35, through primary winding 36 of transformer 37, through switch 34, into terminal 38 of a PSR CC/CV controller integrated circuit 39, through another switch (not shown) inside the PSR CC/CV controller integrated circuit 39, and from the ground terminal 40 of the PSR CC/CV controller integrated circuit 39 to ground node 41. When switch 34 is closed, the current IP that flows through primary winding 36 causes energy to be stored in transformer 37. When switch 34 is opened, the energy is transferred to the output of the power supply in the form of a pulse of secondary current IS that flows through a secondary winding 42 of transformer 37 and through a diode 43. An output capacitor 44 is connected across output terminals 45 and 46 of the power supply. Pulses of secondary current IS charges output capacitor 44. When the power supply is in steady state operation in the constant voltage (CV) mode, switch 34 is switched to open and close rapidly and in such a manner that the output voltage VOUT on capacitor 44 remains substantially constant at a desired regulated output voltage VOUT. The magnitude of output voltage VOUT is related to the voltage VAUX across an auxiliary winding 47. VAUX is divided by a voltage divider including resistors 48 and 49 so that the voltage on the voltage divider tap 50 is sensed on an FB terminal 51 of PSR CC/CV controller integrated circuit 39. PSR CC/CV controller integrated circuit 39 has an internal reference voltage generator that generates an internal reference voltage. Controller integrated circuit 39 regulates VOUT to have the desired regulated output voltage by keeping the voltage on FB terminal 51 equal to the internal reference voltage. In one advantageous aspect, no expensive optocoupler or secondary side voltage reference is required.

The magnitude of the primary current IP is detected by detecting the voltage dropped across a component (not shown) inside PSR CC/CV controller integrated circuit 39. This voltage, which is the product of the IP current flow and the resistance of the component, is sensed and is amplified by a current sense amplifier inside PSR CC/CV controller integrated circuit 39. If the sensed voltage drop corresponds to an output current IOUT that exceeds a specified current limit value, then the power supply is made to operate in a constant-current (CC) operating mode. In the CC mode, the output current IOUT is limited to a desired regulated output current by keeping the peak voltage detected by the current sense amplifier equal to a reference voltage value VILIM.

FIG. 4 (Prior Art) is a waveform that illustrates an operation of PSR power supply 31 of FIG. 2 under light loading conditions. Each time switch 34 is switched on and off in a switching cycle, an amount of energy is transferred to the PSR output. In the waveform of FIG. 4, switch 34 is on from time T1 to time T2. As explained above, energy builds in the magnetic field in the transformer as this primary current IP flows. The primary current IP rises at a substantially fixed rate. When switch 34 is opened at time T2, the magnetic field collapses and energy from the transformer is output in the form of a pulse of secondary current IS. Starting at time T2, the magnitude of the secondary current IS decreases as illustrated.

The VAUX on auxiliary winding 47 is related to VOUT in a known way during the off-time of switch 34, provided that the voltage drop across diode 43 is known. The voltage across diode 43 is known if the diode is forward biased. Accordingly, circuitry inside PSR regulator integrated circuit 39 samples the error voltage on FB terminal 51 at a time T3, shortly before secondary current IS stops flowing. Because only a small amount of energy is draining from the power supply output due to the light loading condition, and because proper regulation requires diode 43 to be forward biased during sampling, the peaks of the IP current pulses have a minimum value IPPEAKMIN. If the loading on the power supply decreases such that the energy transferred to the load due to IP current pulses of this IPPEAKMIN magnitude is too large, then the periods of the switching cycles are made to increase as loading decreases further. One such period 52 is illustrated in FIG. 4 as extending from time T1 to time T6. The IP current pulse is at its minimum magnitude. In some exemplary PSR power supplies, for low loads the period of the switching cycle may be long such as, for example, several milliseconds or more. Such a power supply generally has poor low-power standby mode transient response. If the load on the power supply output were suddenly to increase, and the next sample time may be a substantial amount of time in the future. The controller 39 may not therefore react to the increased loading condition quickly enough, and the output voltage VOUT on the output terminals 45 and 46 may momentarily fall out of regulation.

SUMMARY

In a first novel aspect, in a Primary Side Regulation (PSR) power supply, some primary current pulses are used to transfer energy to the secondary side and thus forward bias an output diode such that an auxiliary winding voltage (VAUX) can be properly sampled after each pulse. These resulting error samples are used to regulate the output voltage VOUT of the power supply. These primary current pulses are referred to here as "regulation primary current pulses".

Other primary current pulses, however, are of a substantially smaller peak amplitude and are referred to here as "output drop detection pulses". These output drop detection pulses are used, not for energy transfer or VOUT regulation, but rather are used to determine whether the output voltage VOUT has dropped. An output drop detection pulse is of such a small peak amplitude that if VOUT does not decrease, then a secondary flyback current induced in the secondary winding as a consequence of the output drop detection pulse is not of adequate magnitude to always forward bias the output diode. If, on the other hand, VOUT decreases, then the secondary flyback current due to an output drop detection pulses does cause the output diode to be forward biased. The PSR controller integrated circuit of the PSR power supply detects an auxiliary-referred voltage signal and from this voltage signal determines whether the output diode was forward biased as a result of an output drop detection pulse. In one example, if VOUT is determined to have dropped in this manner, then the PSR power supply is made to stop operating in a standby mode and is made to begin operating in a higher power normal operating mode.

In a second novel aspect, a PSR power supply includes a low cost optocoupler. A transient current detector circuit within the PSR controller integrated circuit supplies an optocoupler current from a TRS terminal to the optocoupler. A magnitude of the optocoupler current is indicative of the output voltage VOUT of the power supply. The power supply operates in a sleep mode in which the power supply does not switch. In the sleep mode, the TRS current detector circuit monitors the magnitude of the optocoupler current. If the TRS current detector detects that the optocoupler current has changed in a predetermined way (for example, has dropped to a predetermined level), then the power supply is made to stop operating in the sleep mode and is made to operate in another higher power operating mode in which the power supply switches. Because the TRS current detector immediately detects when VOUT has dropped, the PSR power supply has superior transient response and quickly responds to a sudden increase in load despite not switching in its low power sleep mode. In one advantageous aspect, the optocoupler circuitry external to the TRS controller integrated circuit need not include a voltage reference. In another advantageous aspect, the optocoupler only requires very low bias current and does not require accurate gain specification.

Other structures and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 5:
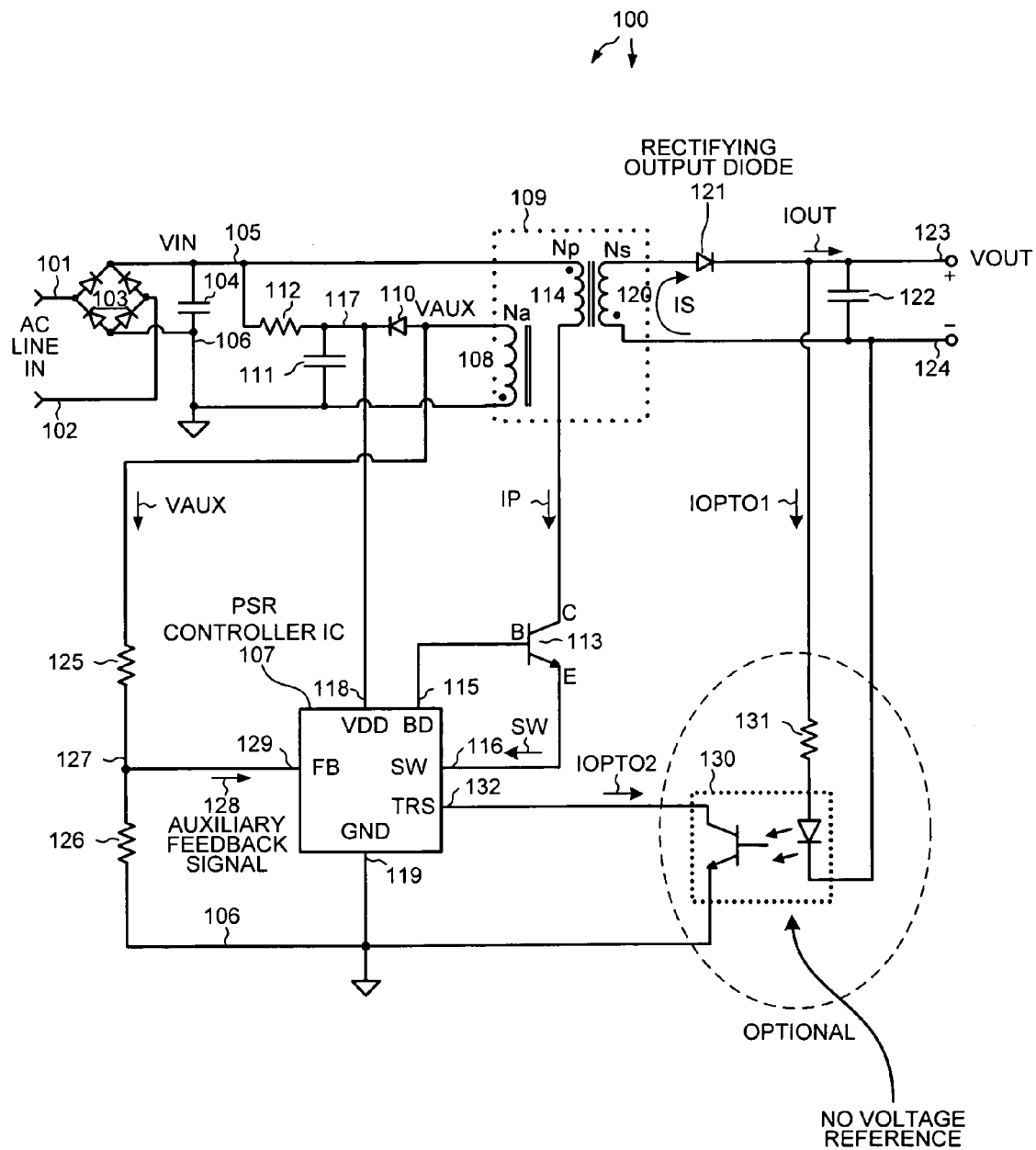
FIG. 5 is a diagram of a Primary Side Regulation (PSR) power supply in accordance with one novel aspect.

FIG. 5 is a block diagram of a Primary Side Regulation (PSR) flyback power supply 100 in accordance with one novel aspect. An alternating current (AC) 110-240 volt line voltage on input terminals 101 and 102 is rectified by a full wave bridge rectifier 103 and an associated smoothing capacitor 104 so that a rectified and smoothed rough DC voltage is present between the first and second input nodes 105 and 106. The voltage on first input node 105 is also referred to as the "input line voltage" or "line input voltage" (VIN). The voltage on second input node 106 is referred to as ground potential.

A PSR controller integrated circuit 107 is powered by a DC voltage supplied by auxiliary winding 108 of a transformer 109 and a rectifier involving diode 110 and capacitor 111. Supply current from node 117 is received onto PSR controller integrated circuit 107 via VDD terminal 118. PSR controller integrated circuit 107 is grounded via GND terminal 119. Immediately after startup when the rectifier has not yet switched an adequate number of times to charge capacitor 111, start up power for integrated circuit 107 is received via resistor 112.

PSR power supply 100 operates by repeatedly closing and opening a switch 113. Closing switch 113 causes a primary current IP to flow from node 105 and through a primary winding 114 of transformer 109 and to switch 113. Switch 113 in this case is a bipolar transistor and current IP flows to the collector of switch. PSR controller integrated circuit 107 includes base drive circuitry for supplying a base drive current to the base of switch 113. This base drive current is supplied via terminal BD 115. PSR controller integrated circuit 107 controls switch 113 and causes it to turn on and to turn off by drawing a current signal SW from the emitter of switch 113. This current signal SW is drawn into terminal SW 116 of PSR controller integrated circuit 107. When switch 113 is on, the primary current IP increases in a fairly linear fashion and reaches a peak current. This flow of current causes energy to be stored in transformer 109. When switch 113 is then turn off, the energy stored in transformer 109 is transferred to the power supply output in the form of a pulse of secondary current IS. The secondary current IS flows through the secondary winding 120 of transformer 109. Secondary current IS flows through secondary winding 120 and through a rectifying output diode 121. Such pulses of the secondary current IS charge an output capacitor 122. Charge is maintained on output capacitor 122 such that a desired voltage VOUT is maintained across power supply output terminals 123 and 124.

The auxiliary winding voltage VAUX is related to the power supply output voltage VOUT in a known way provided the voltage drop across rectifying output diode 121 is known. Accordingly, PSR controller integrated circuit monitors VAUX using a resistor voltage divider involving resistor 125 and 126. The voltage signal on the center tap 127 of the voltage divider, referred to here as the "auxiliary feedback signal" 128, is received onto feedback terminal FB 129 of PSR controller integrated circuit 107. The error in the voltage of the auxiliary feedback signal 128 on terminal FB 129 is sampled at the appropriate time as explained in further detail below to obtain information indicative of the magnitude of VOUT. When the PSR power supply is operating in a constant voltage (CV) mode, the error samples are used to control the switching of switch 113 such that VOUT is regulated to have a desired voltage magnitude.

For additional information on the operation, structure, programming and use of PSR power supplies and techniques, see: 1) U.S. patent application "Primary Side Constant Output Current Controller," Ser. No. 11/311,656, filed Dec. 17, 2005, now U.S. Pat. No. 7,388,764; 2) U.S. patent application "Primary Side Constant Output Voltage Controller," Ser. No. 11/326,828, filed Jan. 6, 2006, now U.S. Pat. No. 7,307,390; 3) U.S. patent application "System And Method For A Primary Feedback Switched Mode Power Supply," Ser. No. 11/635,309, filed Dec. 7, 2006, now U.S. Pat. No. 7,616,459; 4) U.S. patent application "Primary Side Constant Output Current Controller With Highly Improved Accuracy," Ser. No. 11/789,160, filed Apr. 23, 2007, now U.S. Pat. No. 7,911, 808; 5) U.S. patent application "Changing Switching Frequency of a Primary Side Power Converter To Compensate For Inductance Variation," Ser. No. 11/881,666, filed Jul. 26, 2007, now U.S. Pat. No. 7,667,987; 6) U.S. patent application "Start-Up Time Reduction In Switching Regulators," Ser. No. 11/891,397, filed Aug. 10, 2007, now U.S. Pat. No. 7,636, 246; 7) U.S. patent application "Compensating For Base Current In A Primary Side Power Converter That Uses An NPN Bipolar Transistor," Ser. No. 11/893,231, filed Aug. 14, 2007, now U.S. Pat. No. 7,679,936; 8) U.S. patent application "Compensating For Cord Resistance To Maintain Constant Voltage At The End Of A Power Converter Cord," Ser. No. 11/897,131, filed Aug. 28, 2007, now U.S. Pat. No. 7,869, 229; and 9) U.S. patent application "In-Circuit Programming of Output Voltage And Output Current Characteristics Of A PSR Power Supply," Ser. No. 12/079,039, filed Mar. 24, 2008 (the entire subject matter of the above-listed nine patent documents is incorporated herein by reference).

In a first novel aspect described below, small amplitude pulses of primary current are conducted through the primary in a low load situation. These small amplitude pulses are referred to as "output drop detection pulses". A sample of the auxiliary feedback signal after such an output drop detection pulses is not used for VOUT regulation purposes, rather the magnitude of the auxiliary feedback signal is used to determine whether the magnitude of VOUT has dropped in a predetermined way. The output drop detection pulses are therefore usable to determine if the load on the power supply has suddenly increased such that the power supply can be made to change its operation to accommodate the increased load. An optocoupler 130 and a current-limiting resistor 131 are illustrated in FIG. 5. This circuitry is not required in order to carry out the first novel aspect involving the "output drop detection pulses". Accordingly, the optocoupler and current limiting circuitry is labeled "OPTIONAL" in FIG. 5.

Figure 1:
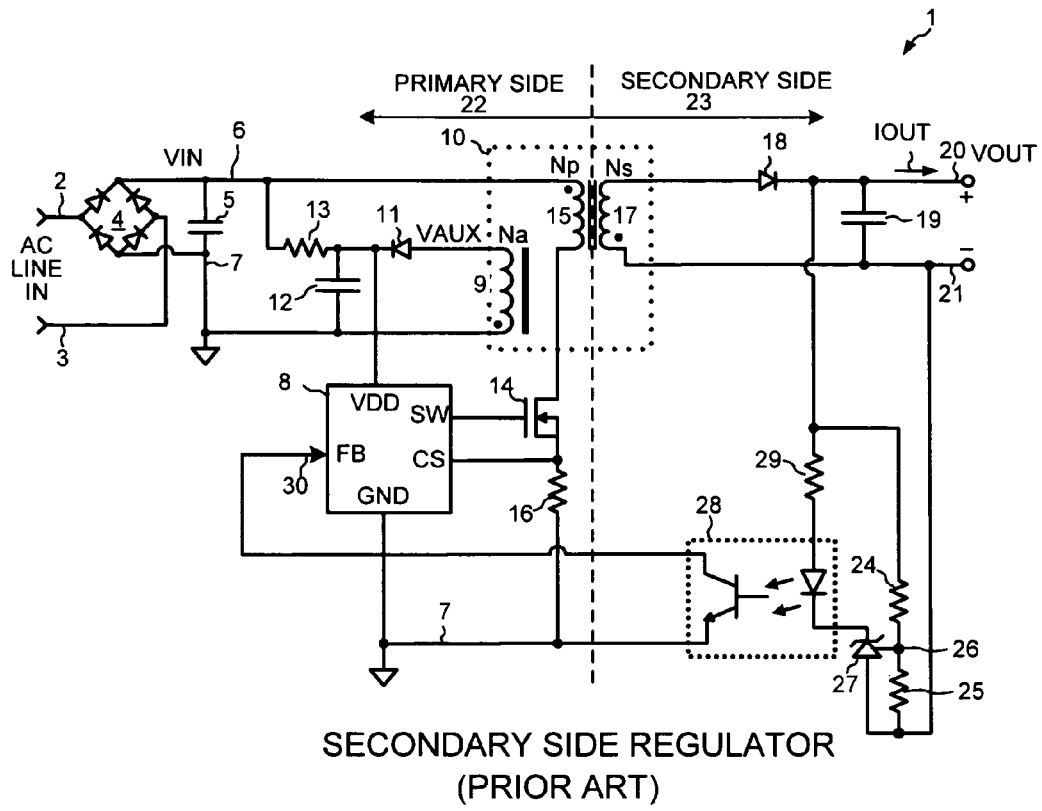
FIG. 1 (prior art) is a diagram of a conventional Secondary Side Regulation (SSR) power supply.
Figure 2:
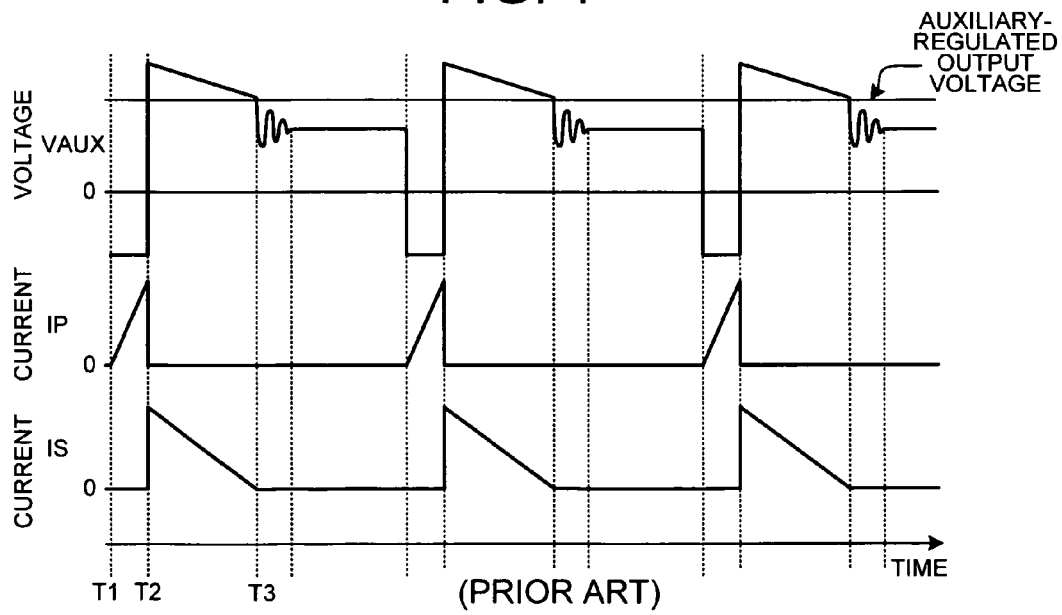
FIG. 2 (prior art) is a waveform diagram that illustrates operation of the SSR power supply of FIG. 1.
Figure 3:
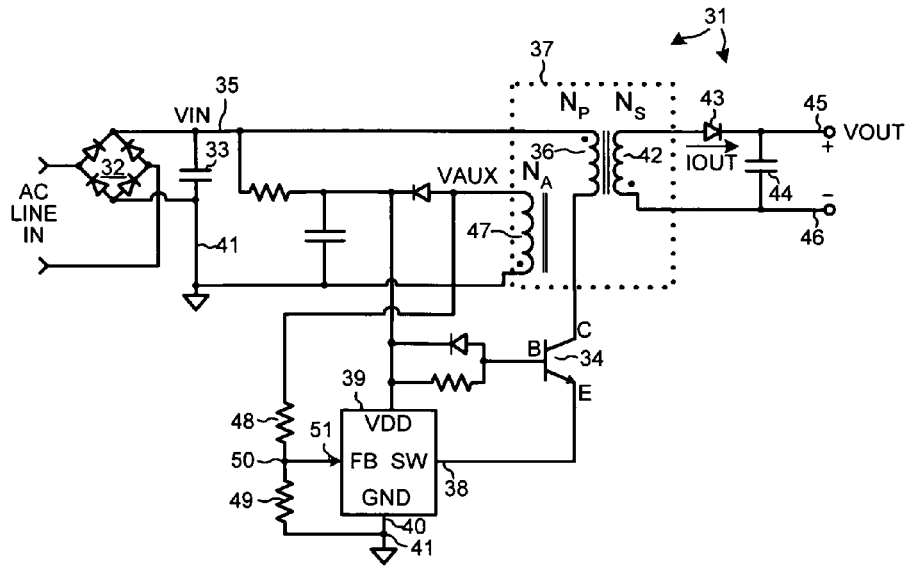
FIG. 3 (prior art) is a diagram of a conventional Primary Side Regulation (PSR) power supply.
Figure 4:
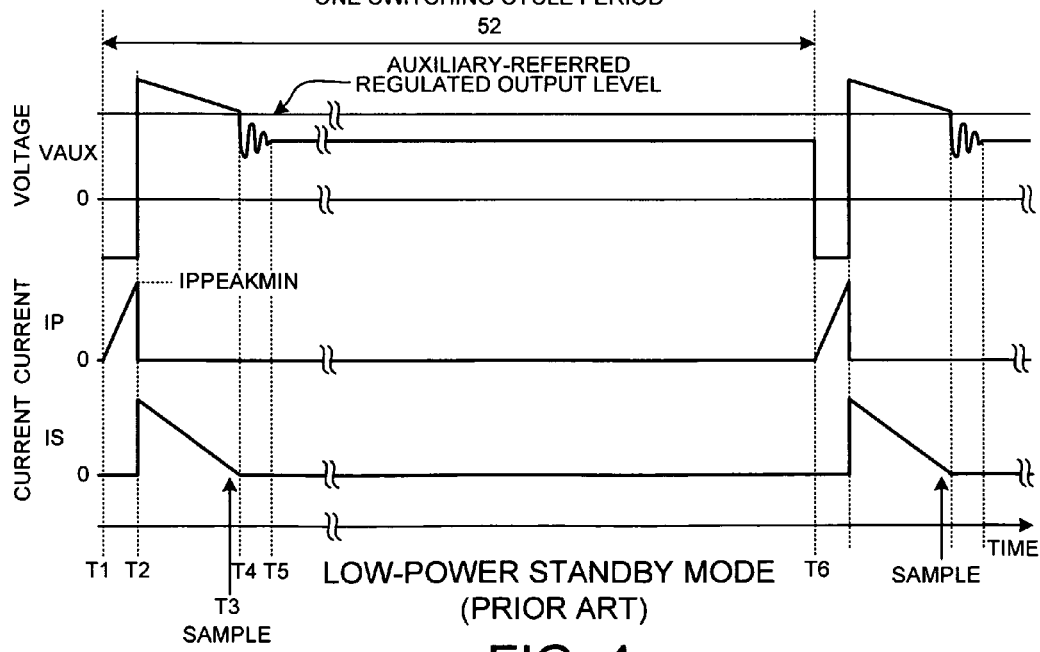
FIG. 4 is a waveform diagram that illustrates operation of the PSR power supply of FIG. 3 in a low-power standby mode.

In a second novel aspect described below, the optocoupler 130 is used to detect whether VOUT has changed in a predetermined way. The magnitude of an optocoupler current IOPTO2 is related to the magnitude of VOUT. A transient current detector circuit (TRS current detector circuit) within PSR controller integrated circuit 107 monitors changes in the magnitude of the current IOPTO2 flowing through terminal TRS 132 and detects whether the current has changed in predetermined way. In one example, if IOPTO2 is detected to have decreased from an initial current level to a second current level that corresponds to a predetermined drop in VOUT, then the TRS current detector circuit causes the PSR controller integrated circuit 107 to stop operating in a sleep mode and to begin operating in another mode in which the power supply supplies more energy per unit time to its output. In this example, the PSR power supply is not switching in the sleep mode and the power supply need not switch in order for the controller to be able to detect the increase in load. The optocoupler and the TRS current detector circuit immediately detect the increase in load, thereby giving the power supply excellent transient response. Of particular importance, the circuitry of the second novel aspect does not involve a costly voltage reference such as voltage reference 27 of FIG. 1. The optocoupler is, however, not "OPTIONAL" in this second novel aspect.

Figure 6:
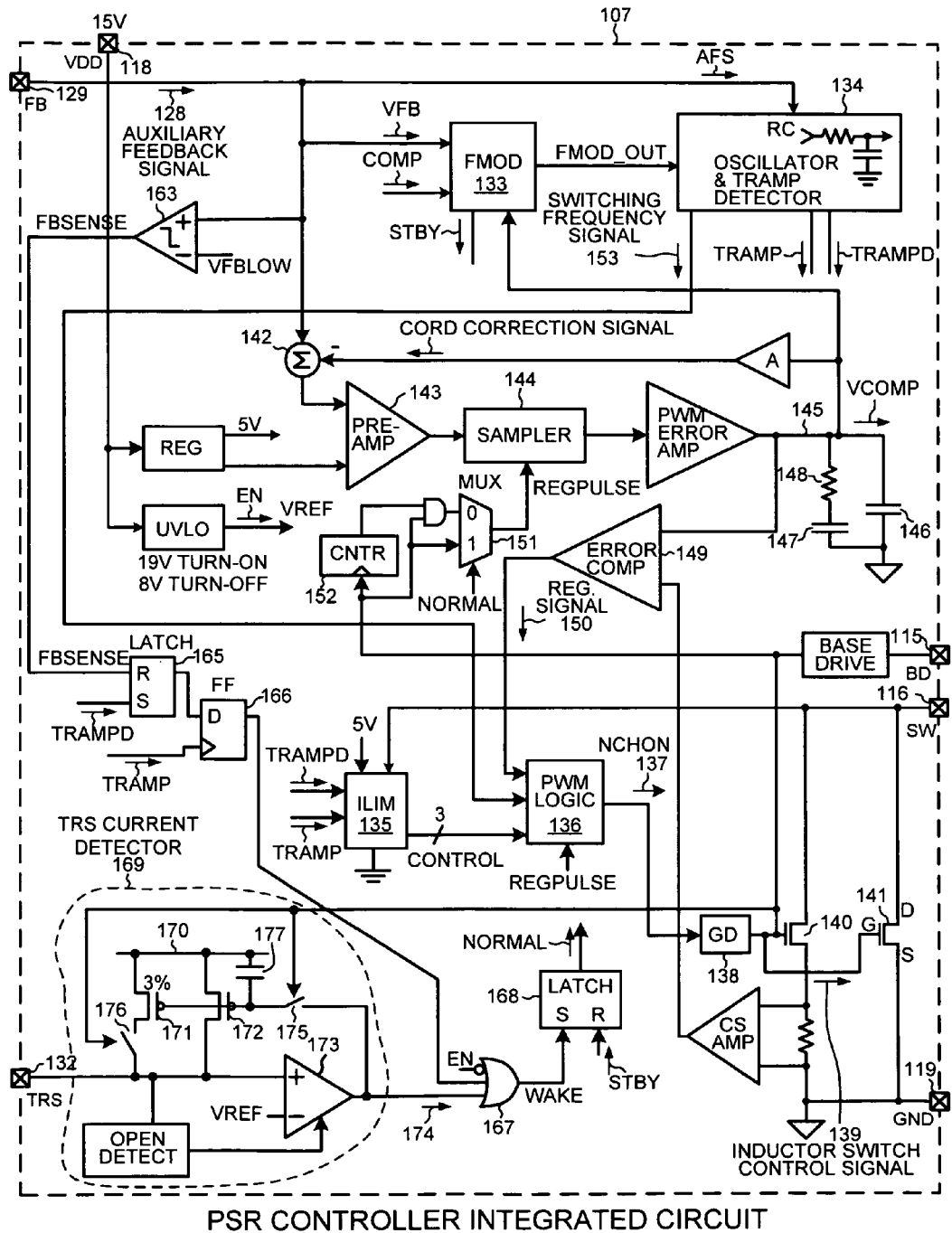
FIG. 6 is a diagram of the PSR controller integrated circuit 107 of the PSR power supply of FIG. 5.
Figure 7:
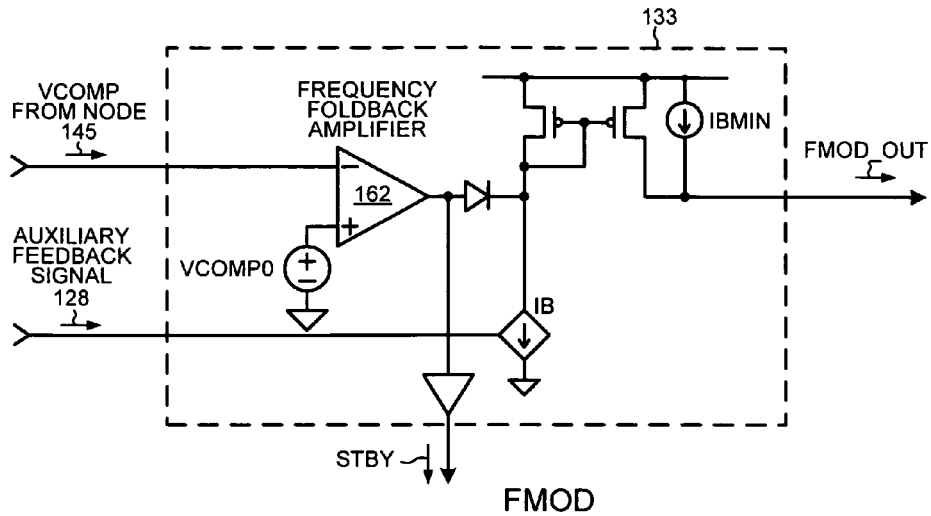
FIG. 7 is a diagram of the FMOD circuit 133 of the PSR controller integrated circuit 107 of FIG. 6.
Figure 8:
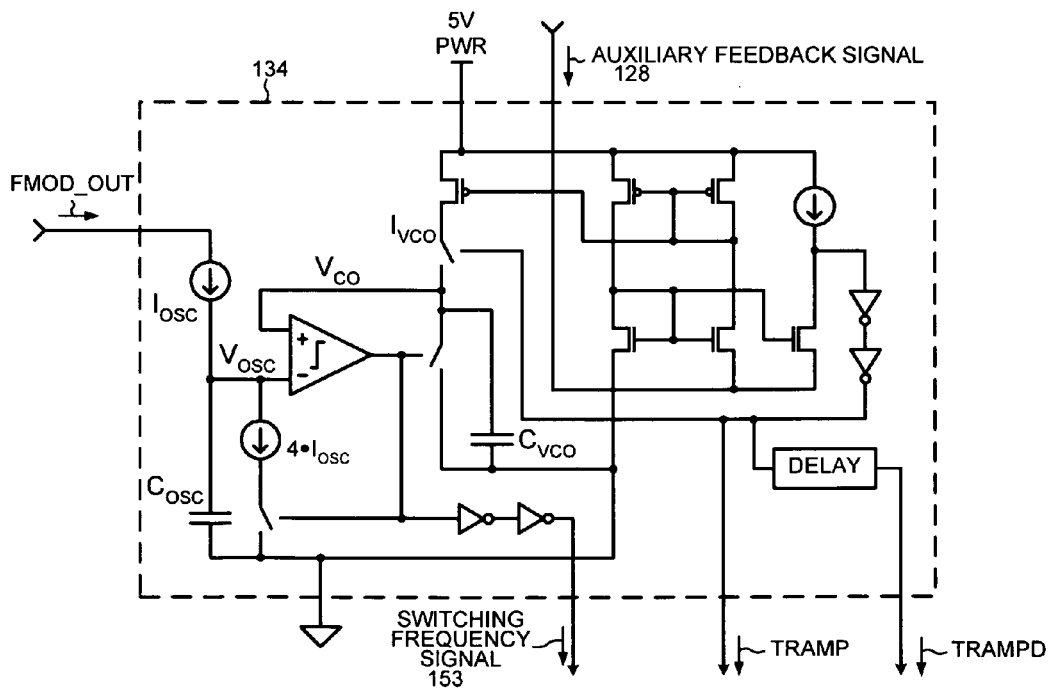
FIG. 8 is a diagram of the oscillator and TRAMP detector circuit 134 of the PSR controller integrated circuit 107 of FIG. 6.
Figure 9:
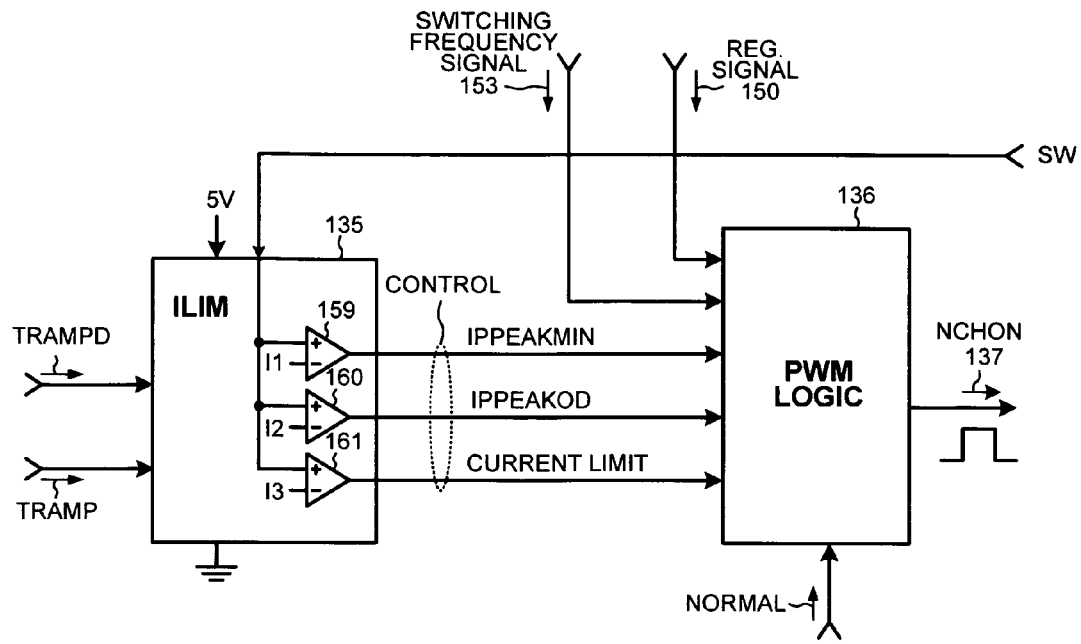
FIG. 9 is a diagram of the ILIM circuit 135 and the PWM logic circuit 136 of the PSR controller integrated circuit 107 of FIG. 6.
Figure 10:
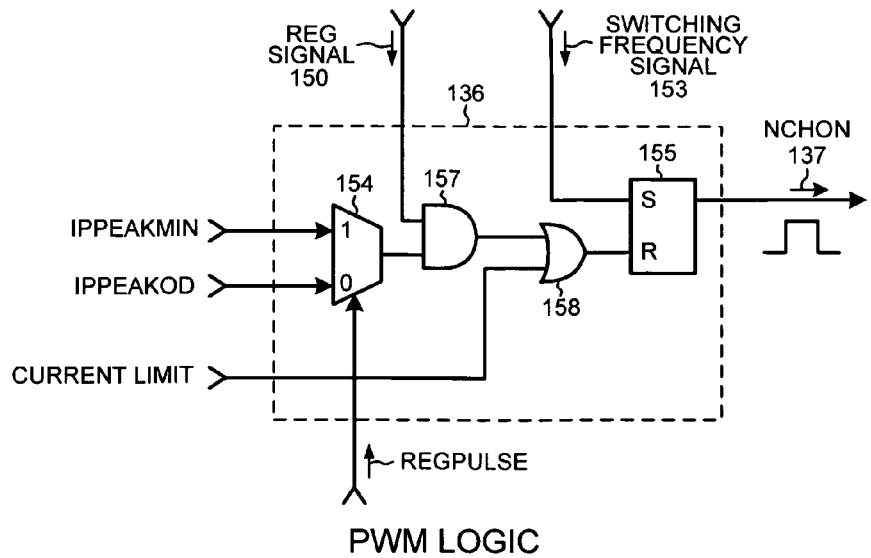
FIG. 10 is a more detailed diagram of the PWM logic circuit 136 of FIG. 9.

FIG. 6 is a more detailed diagram of PSR controller integrated circuit 107 of FIG. 5. FIG. 7 is a more detailed diagram of the frequency modulation (FMOD) circuit 133 of FIG. 6. FIG. 8 is a more detailed diagram of the oscillator and TRAMP detector circuit 134 of FIG. 6. FIG. 9 is a more detailed diagram of the current limit (ILIM) circuit 135 and the pulse width modulation logic circuit 136 of FIG. 6. FIG. 10 is a more detailed diagram of the pulse width modulation (PWM) logic circuit 136 of FIG. 6.

Figure 11:
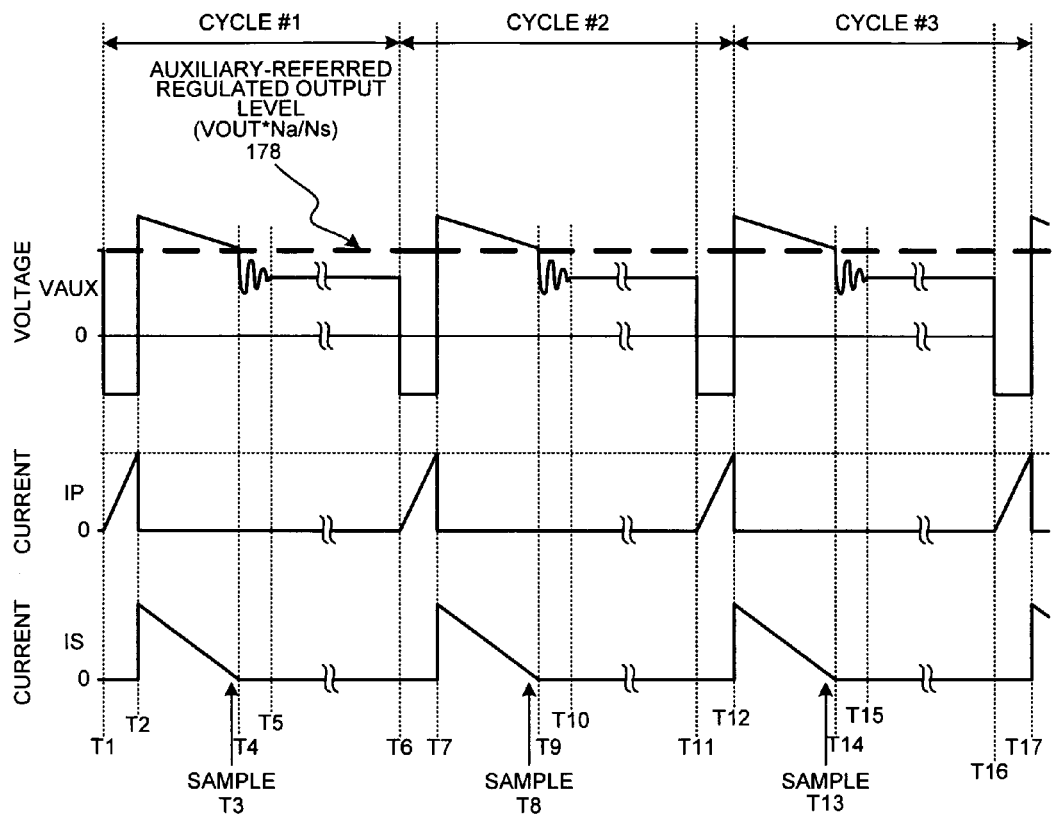
FIG. 11 is a waveform diagram that illustrates operation of the PSR power supply 100 of FIG. 5 in a normal operation mode.

Normal Mode:

Operation of PSR controller integrated circuit 107 in normal mode is described below in connection with the waveform diagram of FIG. 11. PWM logic circuit 136 of FIG. 6 outputs a stream of pulses NCHON 137. These pulses pass through a gate drive circuit 138, thereby becoming an inductor switch control signal 139. Signal 139 is supplied onto the gates of N-channel field effect transistors 140 and 141. The transistors 140 and 141 are therefore pulsed on such that pulses of primary current IP are conducted from switch control terminal SW 116 through the transistors and to ground terminal GND 119. There are four such IP pulses depicted in FIG. 11. The first IP current pulse occurs between times T1 and T2, the second occurs between times T6 and T7, and third occurs between times T11 and T12, and the fourth occurs between times T16 and T17. During each pulse, the IP current ramps up at a fairly constant rate for as long as the transistors 140 and 141 are on. The peaks of the primary current pulses are therefore determined by the amount of on times of transistors 140 and 141. When the switches 140 and 141 are on, the external bipolar switch 113 is on as well.

When transistor 140 and 141 are turned off at the end of an IP pulse, a pulse of current IS is induced in the secondary winding 120. The magnitude of this IS current decreases over time as illustrated in FIG. 11 until the voltage on the secondary winding decreases to the point that output diode 121 (see FIG. 5) is no longer forward biased. When diode 121 stops conducting, the secondary current pulse stops flowing. The diode 121 stops conducting when the voltage on the secondary drops to a voltage one forward bias diode drop higher that VOUT. The auxiliary voltage VAUX has a known relationship to the voltage across the secondary winding. Therefore, if VAUX is sampled at a time just before diode 121 stops conducting at the end of the IS current pulse, then the sample is usable to determine the magnitude of VOUT. Accordingly, a sample is taken shortly before the end of each pulse of secondary current IS. In the circuit of FIG. 6, the auxiliary feedback voltage signal 128 on FB terminal 129 passes through summer 142 and error pre-amplifier 143 and the error in the signal is sampled by sampler 144. Pre-amplifier 143 compares the incoming voltage signal with a reference voltage, so what is sampled by sampler 144 is the error in the voltage signal. The resulting error samples are in analog form and are amplified and integrated on node 145. The voltage charge on capacitors 146 and 147 is slowly changing as compared to the switching frequency. The voltage VCOMP node 145 is compared with the amplified current sense signal at the error comparator 149 and becomes regulation signal 150. Regulation signal 150 is fed back to the PWM logic 136 to close a feedback control loop. If the VAUX is detected to be too large as determined by the level of the voltage VCOMP on node 145, then the widths of the NCHON pulses that turn transistors 140 and 141 on are reduced thereby reducing the amount of secondary current that charges output capacitor 122 during the switching cycle. As a result VOUT decreases. If, on the other hand, the VAUX is detected to be too small as determined by VCOMP on node 145, then the widths of the NCHON pulses that turn transistors 140 and 141 on are increased thereby increasing the amount of secondary current that charges output capacitor 122. As a result VOUT increases. In the waveform illustration of FIG. 11, the dashed line 178 represents the auxiliary-referred regulated output level of VAUX. The pulse after which sampler 144 takes a sample is determined by PWM logic 136. In the normal mode, multiplexer 151 is controlled by the signal NORMAL such that signal on the "1" data input lead of multiplexer 151 is coupled to the data output lead of multiplexer 151 to enable the sampler 144. During each switching cycle, a signal transition of NCHON passes through the multiplexer 151 and causes sampler 144 to initiate a sampling sequence. The signal NORMAL has a digital logic "high" value when the power supply is in the normal mode. In the waveform diagram of FIG. 11, note that one sample is taken every switching cycle, and all these samples are integrated on node 145 and are used for determining how to control transistors 140 and 141 and how to regulate VOUT.

In normal mode, PWM logic circuit 136 of FIG. 10 controls the widths of the NCHON pulses of FIG. 11 as follows. At the beginning of a switching cycle, the switching frequency signal 153 sets latch 155. The signal NCHON output by latch 155 transitions high, thereby starting the IP current pulse. The comparators 159-161 in ILIM circuit 135 of FIG. 9 monitor the current SW passing through transistors 140 and 141 by monitoring the voltage dropped across these transistors. This SW current is essentially the same as the primary winding current IP. As long as the monitored IP current remains below an I1 value (corresponding to IP=IPPEAKMIN), comparator 159 outputs digital signal IPPEAKMIN to be a digital low logic value. As long as IPLEAKMIN is low, AND gate 157 of FIG. 10 outputs a digital logic low level and latch 155 is not reset. In the normal mode, multiplexer 154 is selected to couple the IPPEAKMIN signal on the "1" data input lead to the lower input lead of AND gate 157. This is the condition during times T1 and T2 of FIG. 11 as the IP current increases. The IP current rises. When the IP current level reaches its IPPEAKMIN value, then comparator 159 asserts IPPEAK-MIN to a digital logic high level. The digital high signal passes through multiplexer 154 and to the lower input lead of AND gate 157. The output of AND gate 157, however, remains low until the REG signal 150 on its upper input lead transitions high. REG signal 150 is supplied by error comparator 149 of FIG. 6. If VCOMP on node 145 is relatively low, then error comparator 149 switches the logic level of REG signal 150 when the SW current is relatively low, whereas if VCOMP on node 145 is relatively high, then the error comparator 149 switches the logic level of REG signal 150 when the SW current is relatively high. By adjusting how high the SW current needs to be in order to cause the REG signal 150 to transition high, the output of AND gate 157 is made to transition high earlier or later. When the output of AND gate 157 does transition high, then the high signal passes through OR gate 158 and resets latch 155, thereby terminating the IP pulse. Accordingly, in the normal mode, the width of the IP pulse is at least wide enough that the peak of the IP current pulse reaches its IPPEAKMIN current level, but IP pulse width may be adjusted to be greater than this minimum width by an amount appropriate to regulate VOUT. In the normal mode, all IP current pulses are of at least this IPPEAKMIN peak current level and a sample is taken after each such IP pulse and is used for VOUT regulation purposes. In normal mode, the frequency of the switching frequency signal 153 remains constant so the switching cycles occur at a constant rate. In one representative example, IPPEAKMIN is approximately 100 mA, the current limit of the power supply is approximately 200 mA to 500 mA, IOPTO1 and IOPT2 are approximately 100 uA, and VOUT is regulated to be about 5.0 volts.

Standby Mode:

Operation of PSR controller integrated circuit 107 in standby mode is described below in connection with the waveform diagram of FIG. 12. In standby mode, the digital signal NORMAL has a digital logic "low" level. Multiplexer 151 of FIG. 6 therefore couples the signal on its "0" upper input lead to the input of sampler 144. Counter 152 in this case is a divide-by-four counter and its output signal is a digital logic high one out of every four periods of NCHON signal 137. Sampler 144 is therefore made to sample only once every four switching cycles. The signal output by multiplexer 151 is referred to as REGPULSE. In the example of the waveform of FIG. 12, REGPULSE causes sampler 144 to sample during cycle #1 and during cycle #5. These samples are in analog form and are integrated on node 145. The voltage VCOMP on node 145 is used to regulate VOUT as described above in connection with the normal mode.

Figure 12:
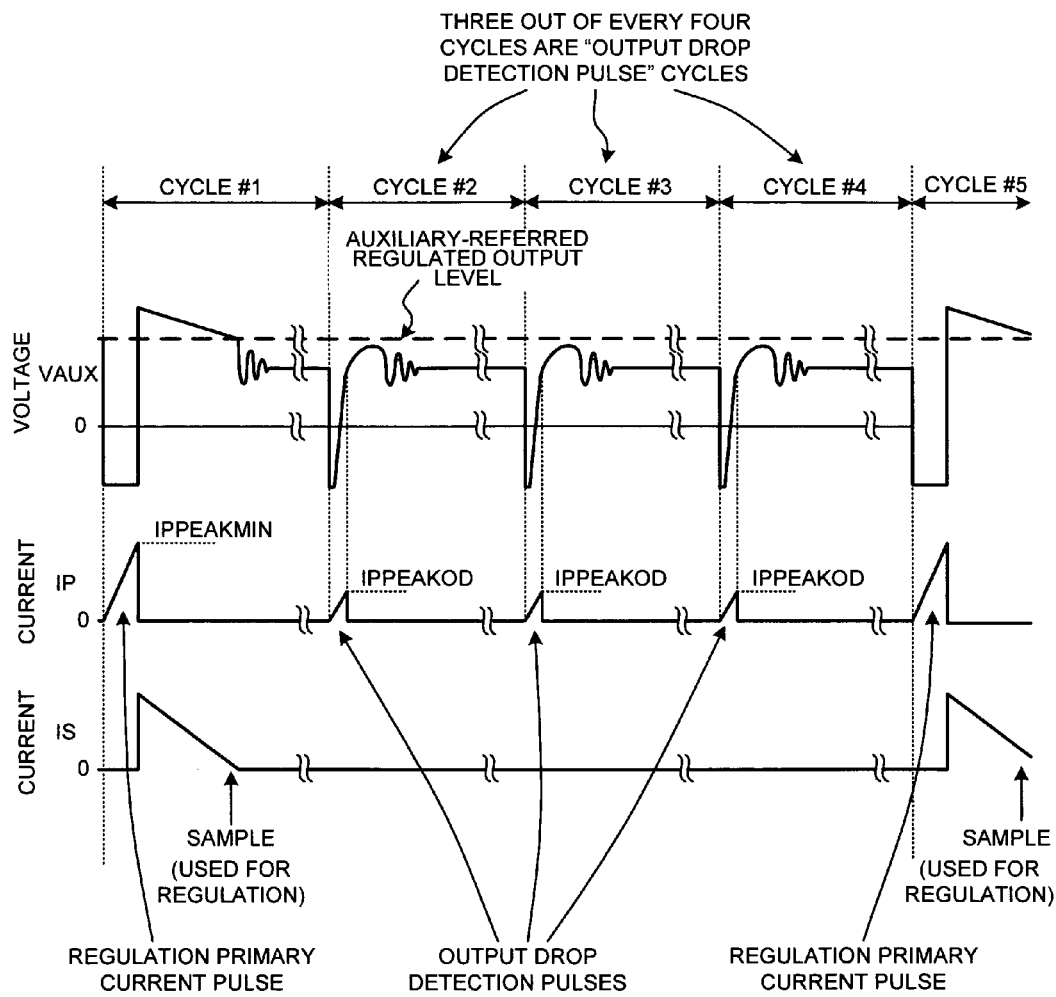
FIG. 12 is a waveform diagram that illustrates operation of the PSR power supply 100 of FIG. 5 in a low-power standby operation mode.

In cycle #1 and cycle #5 of FIG. 12, the counter 152 of FIG. 6 outputs a digital logic high value, and this high signal passes through multiplexer 151 such that signal REGPULSE is a digital logic high. As indicated in FIG. 10, REGPULSE being a digital logic high causes multiplexer 154 to select the IPPEAKMIN digital signal and supply this signal onto the lower input lead of AND gate 157. Accordingly, the PWM logic circuit 136 of FIG. 10 operates as described above in connection with the normal mode in cycle #1 and in cycle #5. An IP pulse is initiated by switching frequency signal 153 setting latch 155. Since in standby mode the load is very light and VCOMP is very low, the REG signal 150 goes high earlier than IPPEAKMIN, so the IP pulse is terminated by IPPEAK-MIN. This results in constant minimum pulses for cycle #1 and cycle #5. A sample of the error in the voltage on FB terminal 129 is taken at the end of the IS current pulse during each of these cycles. These error samples are in analog form and are integrated on node 145 and are used to regulate VOUT.

In cycle #2, cycle #3 and cycle #4 during the standby mode, however, counter 152 outputs a digital logic low level. In standby mode, the signal NORMAL is a digital logic low. REGPULSE therefore does not transition to a digital logic high and sampler 144 does not sample. There is, however, an IP pulse during each of cycle #2, cycle #3 and cycle #4. As indicated in FIG. 12, the width of the IP current pulses in cycle #2, cycle #3 and cycle #4 is small such that the IP peak current is IPPPEAKOD. IPPEAKOD is substantially smaller than IPPEAKMIN, the minimum IP peak current in the normal mode.

PWM logic circuit 136 of FIG. 10 generates the short NCHON pulses to generate the "output drop detection pulses" as follows. The pulses are initiated when switching frequency signal 153 sets latch 155 at the beginning of the switching cycle. As explained above, REGPULSE is low during cycle #2, cycle #3 and cycle #4. Multiplexer 154 therefore selects the digital signal IPPEAKOD on its "0" lower data input lead. As indicated in FIG. 9, IPPEAKOD is generated by comparator 160. IPPEAKOD transitions high when the IP current reaches a lower IPPEAKOD value. Since in standby mode the load is very light and VCOMP is very low, the REG signal 150 goes high earlier than IPPEAKOD, so the IP pulse is terminated by IPPEAKOD. When the IP current reaches IPPEAKOD, then the IPLEAKOD digital signal output by comparator 160 transitions high, and is communicated through multiplexer 154 of FIG. 10 to terminate the IP current pulse. PWM logic circuit 136 therefore controls the pulse widths of the IP current pulses in cycle #2, cycle #3 and cycle #4 such that the IP peak current is IPPEAKOD.

Proper monitoring of VOUT for VOUT regulation purposes requires that the rectifying output diode 121 (see FIG. 5) be forward biased at the time of sampling. Accordingly, proper monitoring of VOUT at the end of an IS current pulse requires that the IS current pulse be of adequate peak current amplitude that diode 121 is forward biased. The anode of diode 121 must be one forward bias diode drop above the VOUT voltage at the time of sampling. There is, therefore, a corresponding minimum peak current required for the "regulation primary current pulses" used for voltage regulation. If in the standby mode the load on the power supply output decreases, then the control loop controls the transistors 140 and 141 to be on for a smaller amount of time such that the IP peak current decreases. Decreasing the IP peak current serves to decrease the secondary peak current, thereby decreasing the amount of current that charges output capacitor 122 per switching cycle. The charging current in each switching cycle is decreased in this way to keep the voltage VOUT on the output capacitor 122 in regulation. If, however, the load decreases to the point that the IP current pulses have their minimum peak values IPPEAKMIN, then PSR power supply 100 switches from operating in the normal mode to operating in the standby mode. In the standby mode, further reduction in charging current to output capacitor 122 is accomplished by decreasing the switching cycle frequency to a minimum value. In addition, in standby mode, some of the IP current pulses are of IPPEAKMIN amplitude (see the IP pulses of cycle #1 and cycle #5 of FIG. 12), whereas others of the IP pulses are of the much smaller IPPEAKOD amplitude (see the IP pulses of cycle #2, cycle #3 and cycle #4 of FIG. 12). The IP current pulses of magnitude IPPEAKMIN are referred to here as "regulation primary current pulses" and are used to regulate VOUT, whereas the IP current pulses of magnitude IPPEAKOD are referred to here as "output drop detection pulses" and are used to detect whether VOUT has dropped.

In the circuit of FIG. 6, if the IP peak current in cycles #1 and #5 of FIG. 12 falls to an IPPEAKMIN value, and if further reductions in energy to the output is required for VOUT regulation, then the oscillator and TRAMP detector circuit 134 decreases the frequency of switching frequency signal 153. This is accomplished using the FMOD circuit 133 of FIG. 7. In this circuit, the auxiliary feedback signal sets the FMOD_OUT current depending on the output voltage level for constant current control. In constant voltage operation, the auxiliary feedback signal voltage is essentially the regulation voltage level. If voltage VCOMP on node 145 is above a reference voltage VCOMP0, then the magnitude of signal FMOD_OUT is fixed. This is the situation in normal mode. If, however, the voltage VCOMP on node 145 is below the reference voltage VCOMP0 as determined by amplifier 162, then FMOD_OUT reduces to an IBMIN level which reduces the rate of switching cycles to a minimum frequency.

In the example of FIG. 12, the three output drop detection pulses of cycle #2, cycle #3 and cycle #4 are of the low peak amplitude IPPEAKOD. The flyback voltage spike on the secondary winding is not of adequate magnitude with respect to the VOUT voltage to always fully forward bias the output diode 121. At low line input voltages, the corresponding flyback pulses of VAUX as detected by PSR controller integrated circuit 107 on terminal 129 can get close to the auxiliary-referred regulated output level for low line voltage without forward biasing the output diode 121. At high line input voltages, the corresponding flyback pulses of VAUX as detected by PSR controller integrated circuit 107 on terminal 129 can involve slight forward biasing of output diode 121. In both cases, the VAUX flyback pulses have peak values close to or exceeding the auxiliary-referred regulated output level.

If VOUT were to drop, then clipping by diode 121 would occur because a larger forward voltage drop would be present across diode 121 at the time of the peaks of the flyback IS pulses. A comparator 163 (see FIG. 6) is therefore provided to compare the magnitude of the auxiliary feedback signal 128 on FB terminal 129 with a reference voltage VFBLOW. The reference voltage VFBLOW is set such that the flyback pulse of the auxiliary feedback signal 128 on terminal FB 129 will exceed VFBLOW if there is no clipping by diode 121 due to lower VOUT, but such that the flyback pulse of the auxiliary feedback signal 128 on terminal FB 129 will be clippped and will not exceed VFBLOW if there is clipping by diode 121 due to lower VOUT. In another embodiment, the VBLOW level can be adaptive and is set relative to the stored peak FB voltage in a prior "output drop detection" cycle, to allow for even faster transient response. In the waveform example of FIG. 12, there is no clipping of the flyback pulses by diode 121 during cycle #2, cycle #3 and cycle #4. The signal FBSENSE as output from comparator 163 therefore pulses high during the peak of the VAUX flyback pulse during each of these cycles. If, however, FBSENSE were to fail to pulse high in this fashion during an "output drop detection pulse" switching cycle in the standby mode, then VOUT would be determined to have dropped and the PSR power supply 100 would be made to stop operating in the standby mode and to begin operating in a higher power normal mode.

Figure 13:
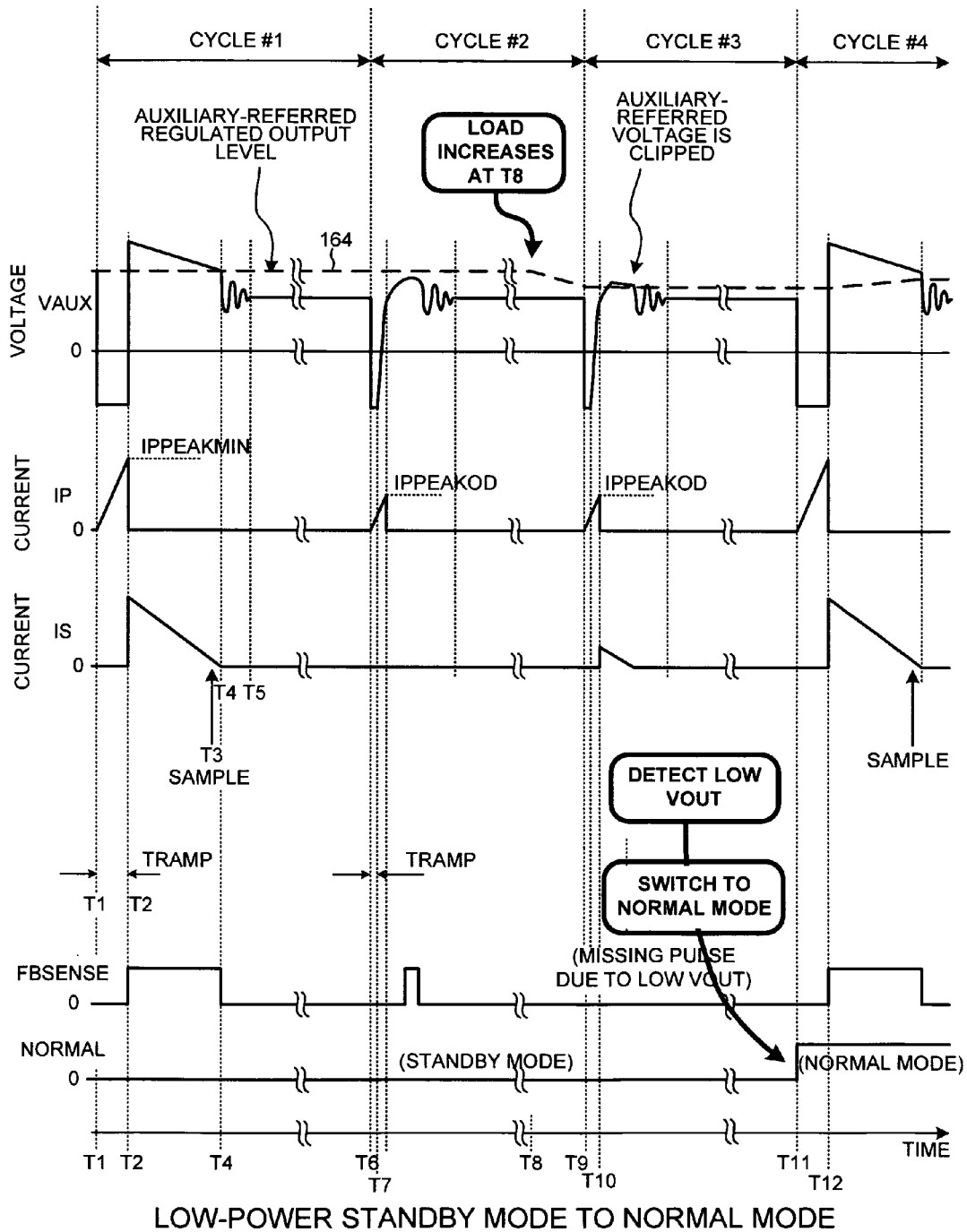
FIG. 13 is a waveform diagram that illustrates how the PSR power supply of FIG. 5 uses "output drop detection pulses" to detect a drop in VOUT, and to cause the power supply to switch from operating in its low-power standby operation mode and to begin operating in its normal operating mode.

FIG. 13 is a waveform that illustrates how the failure of FBSENSE to pulse high is used to determine that VOUT has dropped. Cycle #1 of FIG. 13 is a switching cycle such as cycle #1 of FIG. 12 in which the peak of the IP current pulse is IPPEAKMIN and a voltage error sample is taken and used for VOUT regulation. The second cycle #2 of FIG. 13 is a cycle such as cycle #2 of FIG. 12 in which the peak of the IP current pulse is IPPEAKOD. VOUT has not dropped, so there is no clipping of the VAUX signal. In the example of FIG. 13, at time T8 the load on the power supply increases and VOUT drops. Note the dashed line 164 representing the auxiliary-referred VOUT. This dashed line 164 begins to decrease fairly rapidly at time T8 due to the increased load. The third cycle #3 of FIG. 13 is another cycle in which the peak of the IP current pulse is IPPEAKOD. In this cycle #3, however, VOUT has dropped. The auxiliary-referred VOUT signal on terminal FB 129 therefore has the clipped shape. In this example, as explained in further detail below, this clipped shape in cycle #3 prevents FBSENSE from pulsing high, and this failure of FBSENSE to pulse high is detected as an indication that VOUT has dropped. In response to this detecting, PSR power supply 100 is made to begin operating in the normal mode so that more energy per unit time will be supplied to the output. Accordingly, the waveform NORMAL in FIG. 13 is seen to transition high at time T11. The last switching cycle #4 is therefore a normal mode switching cycle.

Figure 14:
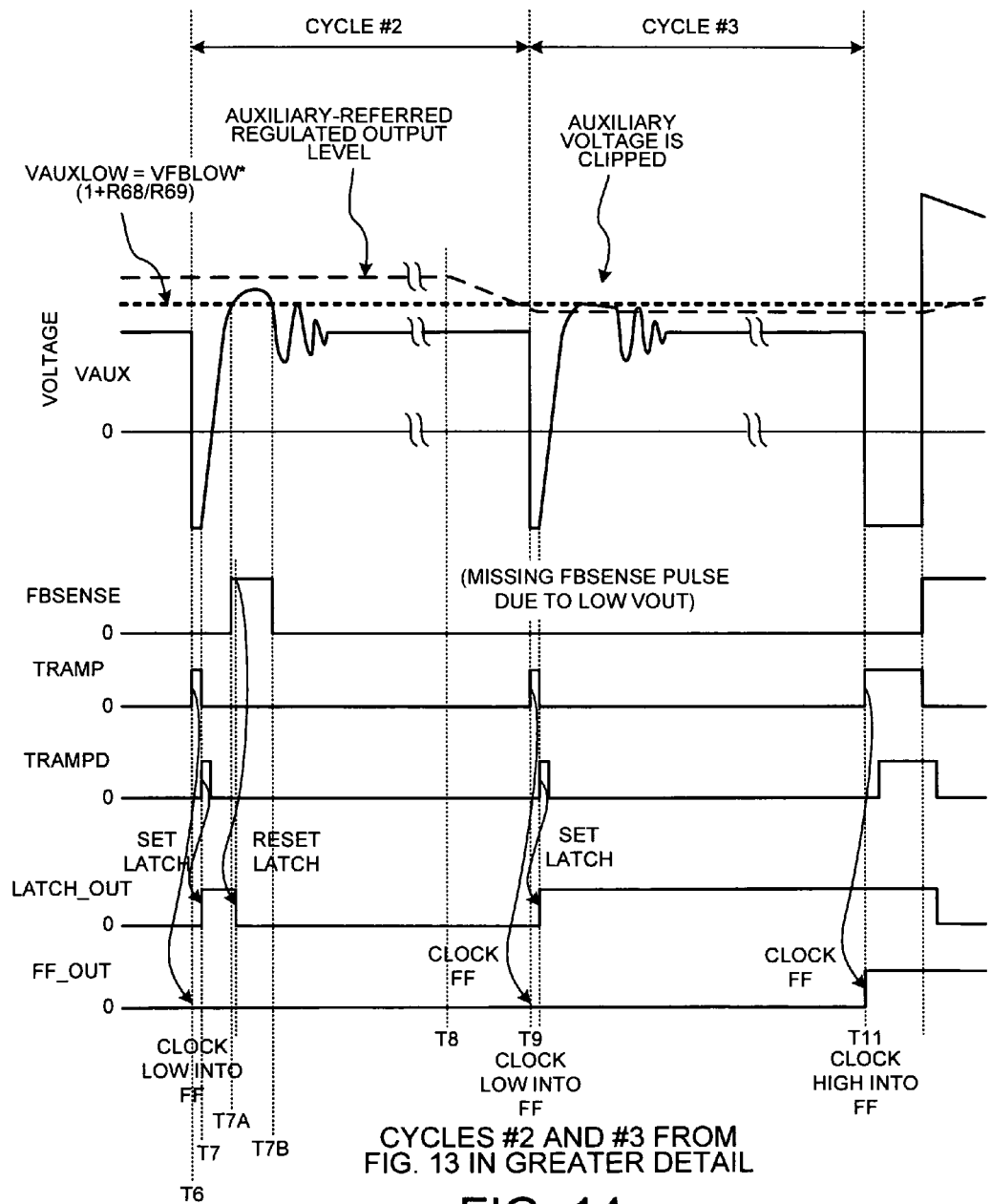
FIG. 14 is a waveform diagram that shows two of the switching cycles of FIG. 13 in further detail.

How the PSR controller integrated circuit 107 of FIG. 6 operates to detect a lack of an FBSENSE pulse in an "output drop detection pulse" cycle is described in connection with FIG. 14. FIG. 14 is an expanded view of cycle #2 and cycle #3 of FIG. 13. At the beginning of each switching cycle, the oscillator and TRAMP detector circuit 134 (see FIG. 6) outputs a TRAMP signal that has a digital logic high value when the IP current is ramping. Circuit 134 also outputs a TRAMPD signal that is a delayed version of TRAMP. These two signals TRAMP and TRAMPD are represented in FIG. 14 by the waveforms labeled TRAMP and TRAMPD. Assume that the output of latch 165 of FIG. 6 is initially outputting a digital logic low signal at the beginning of cycle #2 as represented by the LATCH_OUT waveform of FIG. 14. The TRAMPD signal then sets latch 165 at time T7. Signal LATCH_OUT transitions high. Flip-flop 166 will then clock in the value output by latch 165 at time T9 at the beginning of the next switching cycle. If latch 165 is not reset before time T9, then at time T9 flip-flop 166 will clock in a digital logic high level. The output of flip-flop 166 is an active high signal that indicates VOUT has been detected to have dropped. If VOUT has not dropped, then the signal on terminal FB will flyback above VFBLOW as described above. In cycle #2, this condition occurs at time T7A when comparator 163 of FIG. 6 compares the flyback voltage signal on terminal FB 129 with the voltage VFBLOW and causes FBSENS to transition high. Comparator 163 keeps FBSENSE high until time T7B when the flyback voltage signal on terminal FB again falls below VRBLOW. This pulse of FBSENSE resets latch 165 before the beginning of the next switching cycle at time T9. During each such "output drop detection pulse" cycle, latch 165 is initially set and then a pulse of FBSENSE resets latch 165.

If, however, the load on the power supply increases as indicated at time T8, then comparator 163 will not output a FBSENSE pulse. Accordingly in cycle #3 latch 165 is initially set by TRAMPD but there is no following FBSENSE pulse to reset latch 165. When flip-flop 166 is then clocked by TRAMP at time T11 at the beginning of the next switching cycle, flip-flop 166 clocks in a digital logic high value. As indicated in FIG. 14, the flip-flop output signal FF_OUT transitions high. OR gate 167 (see FIG. 6) asserts the signal WAKE, which in turn sets latch 168, thereby asserting signal NORMAL. Asserting the WAKE signal sets latch 168 and puts the PSR controller integrated circuit 100 into normal mode. Asserting the STBY signal resets latch 168 and puts the PSR controller integrated circuit 100 into standby mode.

Although the prior waveform diagrams for the described embodiment shows power switch 113 as either on or off, in other embodiments power switch 113 may have varying levels of current conduction during switching, the auxiliary waveforms can have pronounced fall time and rise time, and the power switch may be turned off before the primary winding voltage reaches the full rectified line voltage in order to generate a small IPPEADKOD. In yet other embodiments, the IPPEAKOD and IPPEAKMIN magnitudes are controlled with a timer or other control circuit instead of current comparators.

Sleep Mode:

In addition to the "output drop detection pulse" method of putting the PSR controller integrated circuit 107 into its normal mode as described above, there is also a transient current detector circuit 169 method for putting the PSR controller integrated circuit 107 into its normal mode. In a sleep mode, the PSR power supply 100 is not switching. There are no IP pulses of current being conducted through the primary winding of the transformer. Optocoupler 130 of FIG. 5 is, however, drawing a constant IOPTO2 current from TRS terminal 132. The magnitude of IOPTO2 is related to the magnitude of VOUT. On the last switching cycle before entering the sleep mode, TRS current detector circuit 169 (see FIG. 6) servos the voltage on TRS terminal 132 to be equal to VREF when TRS current detector circuit 169 is coupling terminal 132 to a bias current generator with a first current. The first current is determined by the parallel drain currents of transistor 171 and transistor 172. Transistors 171 and 172 are connected in parallel between node 170 and TRS terminal 132. The PSR power supply then enters the sleep mode. During this time, the capacitor 177 holds the gate voltage of transistor 172 to maintain its drain current. However, transistor 171 is disconnected due to switch 176 opening so the total current sourced to the TRS terminal 132 is only 97% of previous value. During this time, an operational amplifier 173 of TRS current detector circuit 169 monitors the voltage on TRS terminal 132 to determine whether the voltage on TRS terminal 132 has increased higher than VREF. An increase in the voltage on TRS terminal 132 higher than VREF is an indication that IOPTO2 has decreased by three percent, and is therefore also an indication that VOUT has dropped by a predetermined amount. If the voltage on TRS terminal 132 is detected by operational amplifier 173 to have increased higher than VREF, then a TRS detector output signal 174 is asserted to a digital logic high level. This high signal causes latch 168 to be set, causes signal NORMAL to be asserted high, and causes the PSR power supply to stop operating in the sleep mode and to begin operating in the normal mode.

There are many ways that TRS current detector circuit 169 can be realized. In the specific circuit illustrated in FIG. 6, operational amplifier 173 sets the voltage on the gates of transistors 171 and 172 such that the voltage on the non-inverting input lead of the op amp is equal to the VREF voltage on the inverting input lead of the op amp. This setting occurs during the last switching cycle before the power supply begins operating in sleep mode. Once this condition is established, then switches 175 and 176 are opened. The voltage on the gates of transistors 171 and 172 is maintained by capacitor 177. The opening of switch 176, however, serves to reduce the bias current into terminal TRS 132 by 3 percent. As a result, the voltage on TRS terminal 132 decreases by virtue of optocoupler 130 pulling the voltage on terminal TRS 132 down when IOPTO2 is being drawn out of terminal TRS 132. The TRS current detector circuit 169 then operates in this condition during sleep mode. Op amp 173 outputs a digital logic low signal because the voltage on TRS terminal 132 is below VREF. If VOUT decreases (for example, due a sudden increase in load), then the IOPTO2 optocoupler current will decrease and the voltage on TRS terminal 132 will increase. If the voltage on TRS terminal 132 increases to exceed VREF, then op amp 173 will switch the logic level of the digital signal 174 to a digital logic high. In the case of no load increase, the self-discharging of the output capacitor by the optocoupler IOPTO1 current causes VOUT to drop after some time, such as after one second, to refresh the VOUT regulation and the TRS current detector circuit 169.

Figure 15:
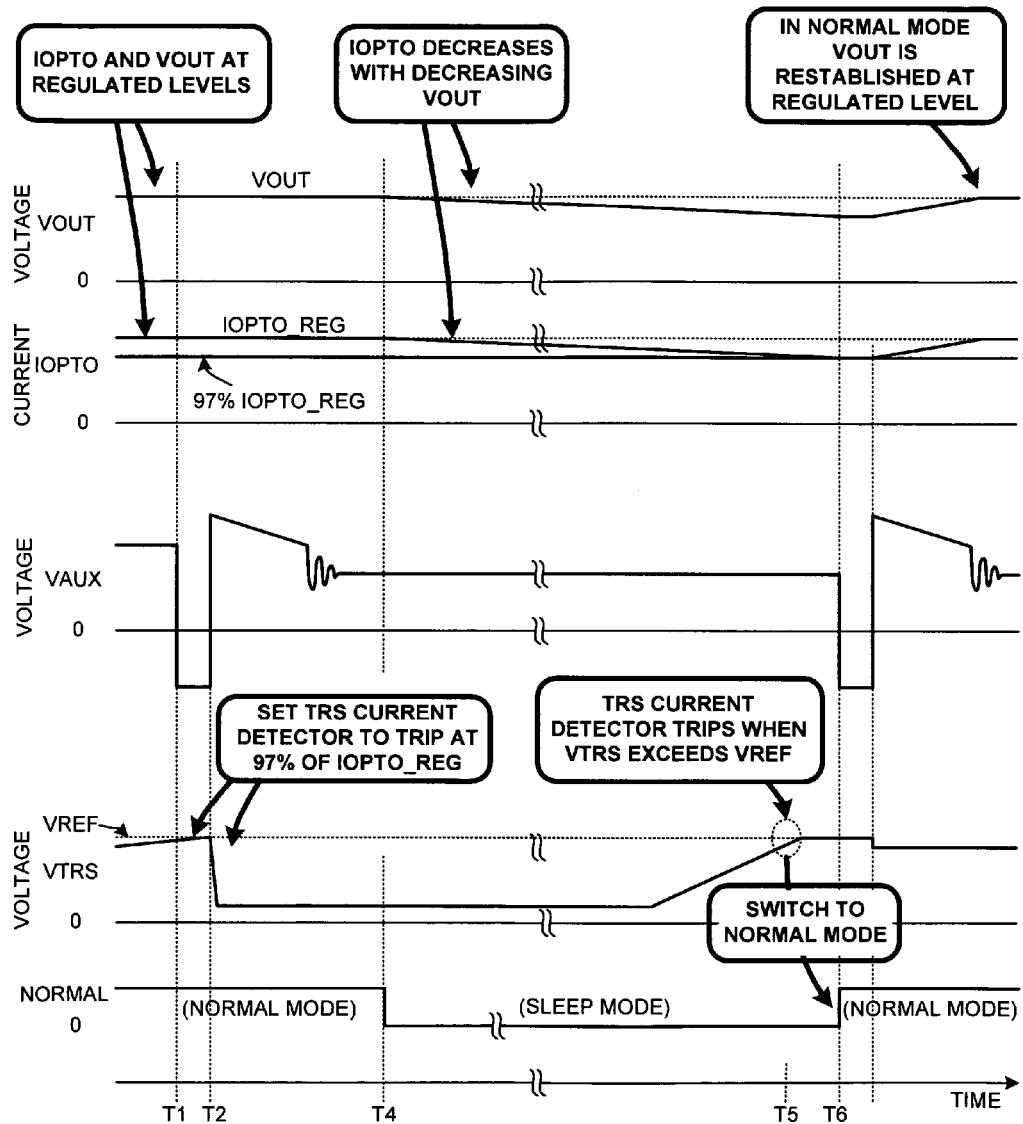
FIG. 15 is a waveform diagram that shows how the TRS current detector 169 of FIG. 6 operates to detect a drop in VOUT.

FIG. 15 is a waveform diagram that illustrates operation of TRS current detector circuit 169 of FIG. 6. Initially, at time T1 and up until time T4, the PSR power supply is operating in the normal mode. VOUT is being regulated and IOPTO2 has a magnitude related to VOUT. When the switch 113 is turned on in the last normal mode switching cycle between times T1 and T2, the switches 175 and 176 of the TRS current detector circuit 169 of FIG. 6 are closed. As described above, the gate voltage of transistors 171 and 172 is set such that the voltage on TRS terminal 132 is VREF when the current level of IOPTO2 is being drawn through optocoupler 130. At about time T2, switches 176 and 175 are opened, thereby setting the TRS current detector to trip at 97 percent of IOPTO2 flowing out of TRS terminal 132. Next, at time T4, power supply operation switches from the normal mode to the sleep mode. As illustrated in FIG. 15, the power supply does not switch in sleep mode. As long as VOUT remains constant, IPOPTO2 drawn out of TRS terminal 132 remains constant, the voltage on TRS terminal 132 remains below VREF, op amp 173 keeps digital signal 174 at a digital logic low level, the power supply continues operating in sleep mode. If, however, VOUT were to drop as in a condition of a sudden increase in power supply load or over a long period due to optocoupler IOPTO1 loading, then the voltage on TRS terminal 132 would rise. This is the situation depicted in FIG. 15. VOUT may also gradually decrease. Regardless of how VOUT decreases, if the voltage on TRS terminal 132 rises to exceed VREF then TRS current detector 169 trips. This condition is depicted at time T5 in FIG. 15. Op amp 173 detects this condition, and asserts digital signal 174 high, thereby asserting the WAKE signal, and causing the power supply to stop operating in sleep mode and to begin operating in normal mode. In normal mode, energy is transferred to the power supply output as the power supply switches, and regulation of VOUT to a desired voltage is reestablished.

Figure 16:
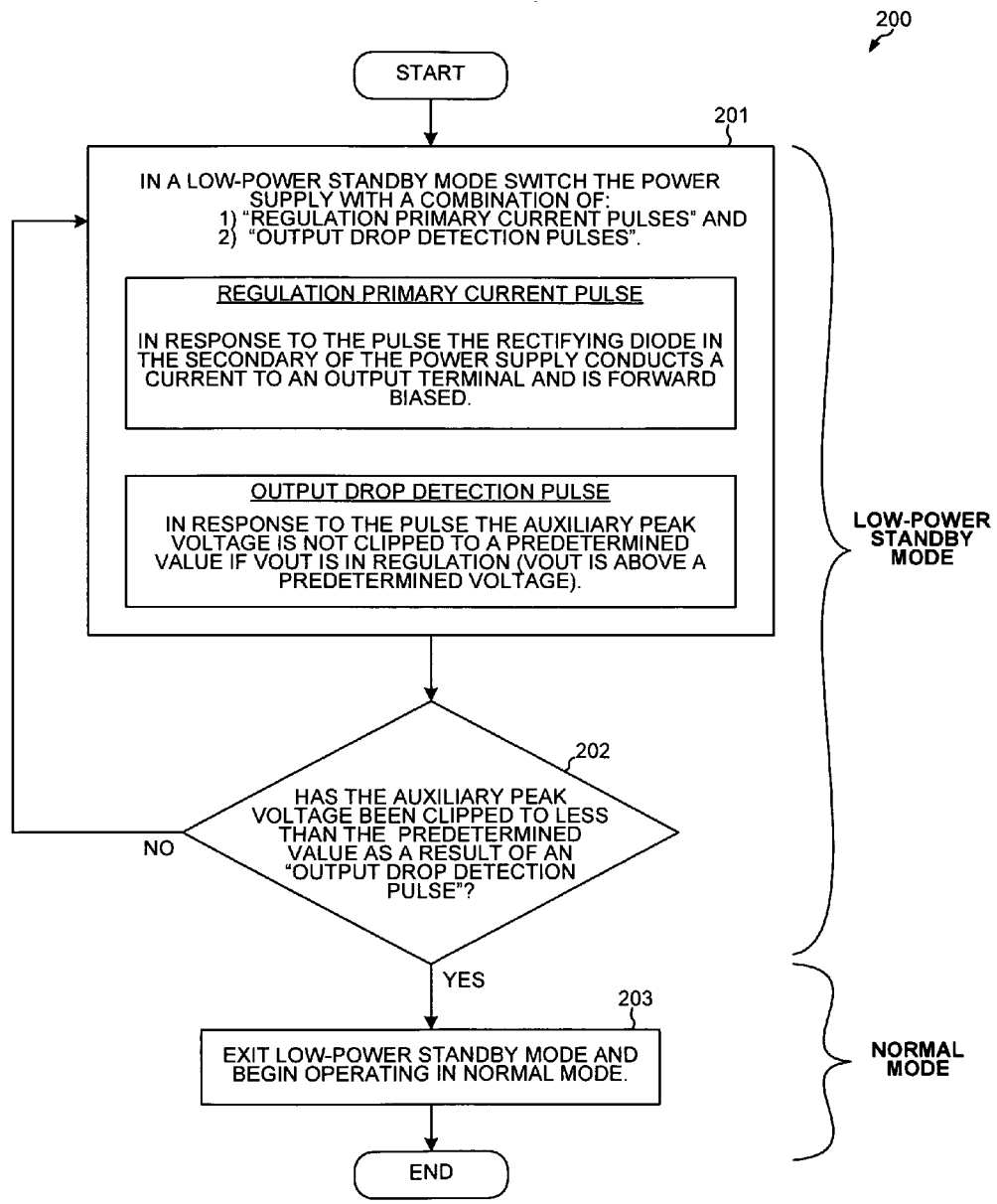
FIG. 16 is a flowchart that illustrates how the PSR power supply of FIG. 6 uses "output drop detection pulses" to detect a drop in VOUT.

Flowcharts:

FIG. 16 is a flowchart of a method 200 in which "output drop detection pulses" are used to detect a drop in VOUT. In a first step (step 201), PSR power supply 100 is operated in the standby mode. The PSR power supply 100 is switched using a combination of regulation primary current pulses (see, for example, cycle #1 of FIG. 12) and output drop detection pulses (see, for example, cycle #2 of FIG. 12). In response to each regulation primary current pulse, a sample of the voltage error of the signal on FB terminal 129 is taken and is integrated and used to regulate VOUT. The output drop detection pulses are not used for VOUT regulation, and they are not followed by error samples that affect the integration developed in response to the regulation primary current pulses. Rather, the output drop detection pulses are weak pulses used to determine whether VOUT has dropped.

If the auxiliary peak voltage is not detected to have been clipped to a lower value in response to an output drop detection pulse (step 202), then the PSR power supply continues operating in the standby mode. If, however, the auxiliary peak voltage is detected to have been clipped to a lower value in response to an output drop detection pulse, then the PSR power supply stops operating in the standby mode (step 203) and begins operating in the normal mode.

Figure 17:
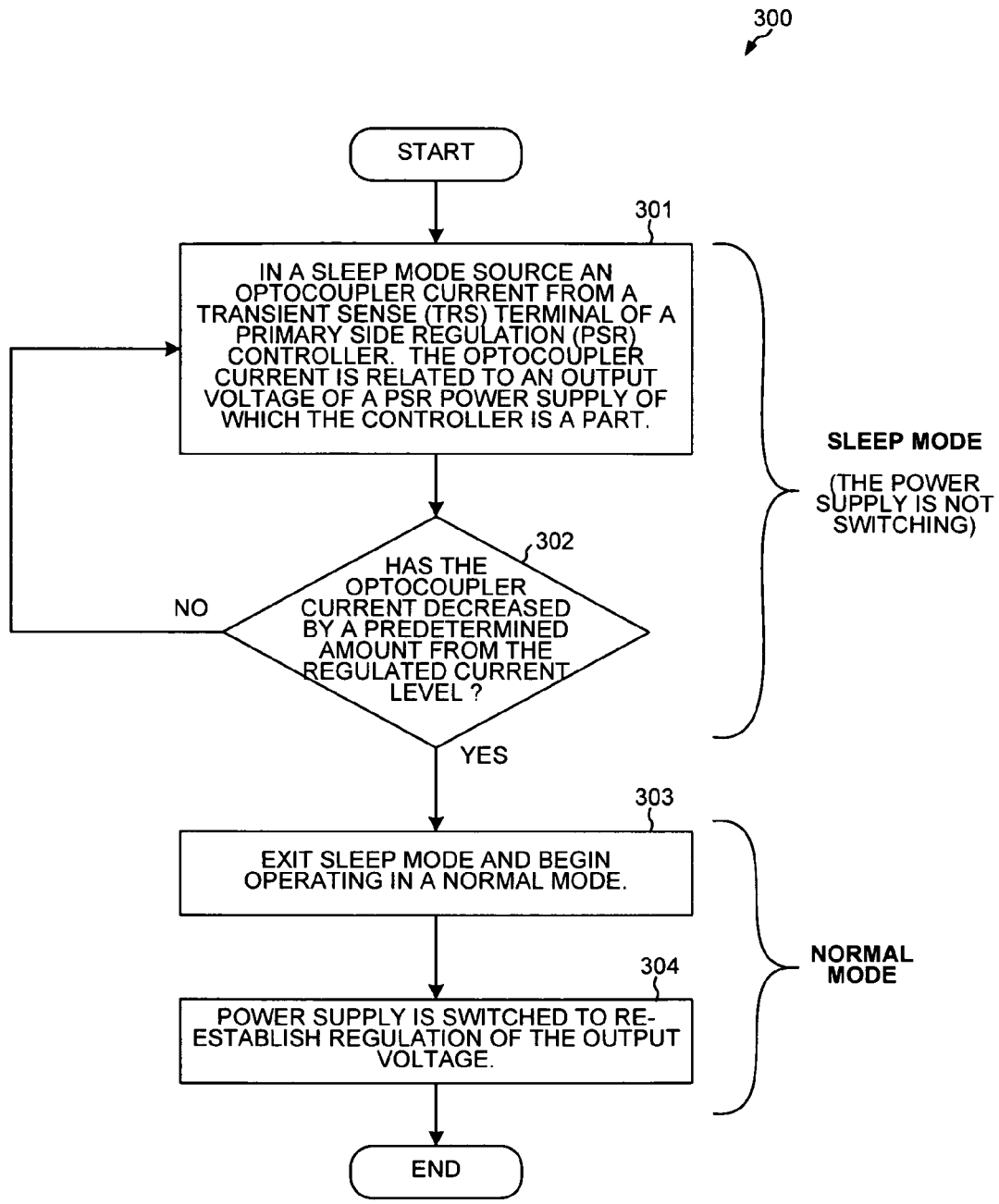
FIG. 17 is a flowchart that illustrates how the PSR power supply of FIG. 6 uses the TRS current detector to detect a drop in VOUT.

FIG. 17 is a flowchart of a method 300 in which TRS current detector circuit 169 is used to detect a drop in VOUT and to cause the PSR power supply 100 to switch operating modes. In a first step (step 301), an optocoupler current is sourced from TRS terminal 132 of PSR controller integrated circuit 107. The magnitude of the optocoupler current flowing out of TRS terminal 132 is related to the magnitude of output voltage VOUT of the power supply. If the optocoupler current is not detected to have dropped by a predetermined amount from the optocoupler current level sourced when VOUT is in regulation, then the TRS current detector circuit 169 does not cause the PSR power supply to switch modes. The PSR power supply continues operating in sleep mode and does not switch. If, however, the optocoupler current is detected (step 302) to have dropped by a predetermined amount from the optocoupler current level sourced when VOUT is in regulation, then the TRS current detector circuit 169 causes the PSR power supply to exit sleep mode (step 303) and to begin operating in normal mode. The PSR power supply switches in normal mode, and reestablishes VOUT regulation at the desired output voltage.

Although certain specific embodiments are described above for instructional purposes, the teachings of this patent document have general applicability and are not limited to the specific embodiments described above. Although an embodiment is described in which the switch 113 is a bipolar transistor, in other embodiments the switch can be another type of switch such as a MOSFET power switch. Although an embodiment is described in which the switch 113 has both base drive and emitter drive, in other embodiments the switch can turned on and off using any of base drive mode, gate drive mode, emitter drive mode, or source drive mode. The external power switch 113 (FET or bipolar) may be removed if the internal FET possesses the proper high voltage rating. An external current sense resistor may be used rather than an internal current sense resistor. In another embodiment, the optocoupler may be connected between supply voltage VDD and the TRS terminal such that the optocoupler current flows into the TRS terminal. Accordingly, various modifications, adaptations, and combinations of various features of the described embodiments can be practiced without departing from the scope of the invention as set forth in the claims.

What is claimed is:

1. A method comprising:
   (a) regulating a Primary Side Regulator (PSR) output voltage (VOUT) by conducting first pulses of current through a primary winding of a transformer, and sampling an auxiliary winding feedback voltage (VAFB) after each first current pulse thereby generating samples, and using a result of the sampling to control subsequent first current pulses such that VOUT is regulated; and
   (b) in between two of the first current pulses, conducting a second pulse of current through the primary winding without affecting the use of the result of the sampling in (a) to regulate VOUT in (a), but monitoring VAFB after the second current pulse and thereby determining if VOUT has dropped below a predetermined voltage.

2. The method of claim 1, wherein the samples of VAFB are voltage error samples taken after each first current pulse are integrated in (a), and wherein a result of the integrating of the samples in (a) is used in the controlling of the subsequent first current pulses such that VOUT is regulated in (a), and wherein the second pulse of current in (b) is conducted through the primary winding in (b) without affected the integrating of samples in (a).

3. The method of claim 2, wherein the first pulses are controlled in (a) by controlling a rate at which the first pulses occur.

4. The method of claim 3, wherein the first pulses have a first peak current value, wherein the second pulse has a second peak current value, and wherein the second peak current value is substantially smaller than the first peak current value.

5. The method of claim 4, further comprising:
   (c) pulling another second pulse of current through the primary winding without affecting the integrating of samples in (a), and monitoring VAFB after said another second pulse and thereby determining that VAFB has dropped below the predetermined voltage; and
   (d) in response to the determining that VAFB has dropped in (c) changing an operation of the PSR such that subsequent first pulses are pulled through the primary winding without any intervening second pulses.

6. The method of claim 4, further comprising:
   (c) pulling another second pulse of current through the primary winding without affecting the integrating of samples in (a), and monitoring VAFB after said another second pulse and thereby determining that VAFB has dropped below the predetermined voltage; and
   (d) in response to the determining that VAFB has dropped in (c) changing an operation of the PSR such that more energy per unit time is transferred to a load of the PSR.

7. The method of claim 4, further comprising:
   (c) pulling another second pulse of current through the primary winding without affecting the integrating of samples in (a), and monitoring VAFB after said another second pulse; and
   (d) in response to a result of the monitoring of (c) changing an operation of the PSR such that the PSR changes from operating in a low-power standby mode to a higher power normal operating mode.

8. The method of claim 1, wherein the transformer of the PSR includes the primary winding, a secondary winding, and the auxiliary winding, wherein a resistor voltage divider of the PSR is coupled to the auxiliary winding, and wherein VAFB is a voltage on a tap of the resistor voltage divider.

9. A method comprising:
   (a) operating a Primary Side Regulator (PSR) in a low-power standby mode, wherein an energy transfer cycle of the PSR occurs from when a first pulse is conducted through a primary winding of a transformer causing a resulting secondary-side pulse of current to flow through a secondary winding of the transformer until a next following first pulse is conducted through the primary winding, wherein each first pulse has a peak current that is above a predetermined peak current level, and wherein an output voltage (VOUT) output by the PSR is regulated by the PSR by adjusting a rate of first pulses of energy transfer cycles; and
   (b) during operation of the PSR in the low-power standby mode causing a second pulse of current to be conducted through the primary winding during an energy transfer cycle, and monitoring a voltage on an auxiliary winding of the transformer after the second pulse of current, wherein the second pulse does not cause any pulse of current to flow through the secondary winding, and wherein the second pulse of current has a peak current that is substantially smaller than the predetermined peak current level.

10. A method comprising:
(a) operating a Primary Side Regulator (PSR) in a low-power standby mode in which first pulses of current are conducted through a primary winding of a transformer, wherein there is one first pulse in each of a series of switching cycles of the RSR, wherein the first pulses all have peak currents that are above a predetermined peak current level, and wherein an output voltage (VOUT) output by the PSR is regulated by the PSR by adjusting a rate of the switching cycles; and
(b) during operation of the PSR in the low-power standby mode causing a second pulse of current to be conducted through the primary winding, and monitoring a voltage on an auxiliary winding of the transformer after the second pulse, wherein the second pulse of current has a peak current that is substantially smaller than the predetermined peak current level, wherein no pulse of current is conducted through the primary winding at any time between a time the second pulse of current occurs and a time when the voltage on the auxiliary winding is monitored in (b).

11. The method of claim 9, further comprising:
(c) based at least in part on a result of the monitoring of (b) changing an operating mode of the PSR from the low-power standby mode to a higher power normal operating mode.

12. The method of claim 9, further comprising:
(c) based at least in part on a result of the monitoring of (b) changing an operating mode of the PSR such that the PSR outputs a larger amount of energy per unit time.

13. An integrated circuit for controlling a switch in a Primary Side Regulator (PSR), the integrated circuit comprising:
a voltage regulator adapted to turn the switch on and off such that each of a plurality of first pulses of current is conducted through a primary winding of a transformer causing a resulting secondary-side pulse of current to flow through a secondary winding of the transformer, wherein the first pulses all have peak currents that are above a predetermined peak current level, and wherein an output voltage (VOUT) of the PSR is regulated by the voltage regulator adjusting a rate of the first pulses; and
means for causing the switch to be turned on and off such that a second pulse of current is conducted through the primary winding, wherein the second pulse has a peak current that is substantially smaller than the predetermined peak current level of the first pulses, and wherein the second pulse of current does not cause any pulse of current to flow through the secondary winding.

14. The integrated circuit of claim 13, wherein the means is for determining whether a voltage induced on an auxiliary winding of the transformer in response to the second pulse is below a predetermined voltage.

15. The integrated circuit of claim 13, wherein the second pulse occurs during a time that the voltage regulator is regulating VOUT by adjusting the rate of the first pulses.

16. The integrated circuit of claim 15, wherein the regulator includes a sampler and an integrator that integrates samples output by the sampler, and wherein neither the sampler nor the integrator is a part of the means.

17. The integrated circuit of claim 16, wherein the means includes a comparator that compares a voltage received onto a terminal of the integrated circuit to a predetermined reference voltage.

18. A method comprising:
(a) operating a Primary Side Regulator (PSR) in a first operating mode in which first pulses of current are conducted through a primary winding of a transformer, and wherein an output voltage (VOUT) output by the PSR is regulated by the PSR by controlling peak currents of the first pulses, wherein the peak currents of the first pulses in the first operating mode have a minimum peak current; and
(b) operating the PSR in a second operating mode in which a second pulse of current is conducted through the primary winding, wherein in response to the second pulse a current pulse is induced in an auxiliary winding of the transformer and no current pulse is induced in a secondary winding of the transformer, and monitoring a voltage on the auxiliary winding approximately at an end of the current pulse in the auxiliary winding, wherein the monitoring of the voltage on the auxiliary winding is not used to regulate VOUT, and wherein the second pulse in the second operating mode has a peak current that is substantially smaller than the minimum peak current of the first pulses in the first operating mode.

19. The method of claim 18, wherein in the second operating mode third pulses of current are conducted through the primary winding in addition to the second pulse of current, wherein the third pulses of current are used to regulate VOUT in the second operating mode.

20. The method of claim 18, wherein the third pulses in the second operating mode have a repetition rate, and wherein the repetition rate is adjusted to regulate VOUT.

21. The method of claim 18, wherein the first pulses in the first operating mode have a constant repetition rate.

* * * * *